United States Patent [19]

Ebner et al.

[11] 3,776,531

[45] Dec. 4, 1973

[54] APPARATUS AND PROPELLER FOR ENTRAINING FLUIDS IN LIQUIDS

[76] Inventors: George A. Ebner; Marjorie J. Ebner, both of 1405 S. Hillcrest Dr., Fort Collins, Colo.

[22] Filed: Mar. 16, 1972

[21] Appl. No.: 235,288

Related U.S. Application Data

[63] Continuation-in-part of Ser. No. 1,523, Jan. 8, 1970, abandoned.

[52] U.S. Cl. ................................................. 261/87
[51] Int. Cl. .............................................. B01f 3/04
[58] Field of Search .................. 261/87, 93; 259/95, 259/96; 210/220, 221, 14, 15, 194, 195; 209/168, 169

[56] References Cited
UNITED STATES PATENTS

| | | | |
|---|---|---|---|
| 1,616,655 | 2/1927 | Gilchrist | 261/87 |
| 2,239,194 | 4/1941 | Fitzgerald et al. | 261/87 |
| 2,928,661 | 3/1960 | MacLaren | 261/87 |
| 3,212,759 | 10/1965 | Brown | 261/87 |
| 3,251,471 | 5/1966 | Allen | 261/123 |
| 3,273,866 | 9/1966 | Lancy | 261/124 |
| 3,400,918 | 9/1968 | MacLaren | 210/220 |
| 3,512,762 | 5/1970 | Umbricht | 210/221 |

FOREIGN PATENTS OR APPLICATIONS

| | | | |
|---|---|---|---|
| 745,457 | 2/1956 | Great Britain | 261/87 |
| 878,006 | 9/1942 | France | 261/93 |
| 1,093,699 | 11/1954 | France | 261/87 |

*Primary Examiner*—Tim R. Miles
*Attorney*—Duane Burton

[57] ABSTRACT

Apparatus and propeller for dispersing and entraining a fluid, particularly a gas, in a liquid. The apparatus includes a propeller shaft mounted for rotation, said shaft being closed at one end and having a channel therein communicating at the other end with the fluid to be dispersed, means for rotating the shaft, at least one series of diametrically aligned screw-propeller blades equidistantly spaced around said shaft extending radially from said shaft, and a plurality of diametrically aligned aspirator tubes disposed proximately to said blades equidistantly spaced around said shaft, each of said tubes having a free end disposed generally radially outwardly at least as far as the outer portions of said blades, each of said tubes having a generally longitudinally extending opening formed therethrough, each of said openings being disposed in fluid communication with said channel, and each of said tubes being mounted on said shaft to form an included angle between the longitudinal axis of the opening adjacent the free end thereof and the longitudinal axis of the shaft of not less than 35° nor more than 75°. Each of the tubes is also mounted on said shaft to form an included angle between the longitudinal axis of the opening adjacent the free end thereof and a radially extending plane having the longitudinal axis of said shaft lying therein of not less than one-half degree nor more than 3°. The method of dispersing and entraining fluids in a liquid comprises generating a columnated current of liquid within a body of liquid, creating one or more zones of reduced pressure in the body of liquid adjacent the outer periphery of said columnated current of liquid and rotating said zone or zones about the outer periphery of said columnated current of liquid, introducing a fluid into said body of liquid adjacent the outer periphery of said columnated current of liquid and forming minute globules or bubbles of fluid adjacent the outer periphery of said columnated current of liquid, and entraining said globules or bubbles of fluid within said columnated current of liquid.

9 Claims, 4 Drawing Figures

United States Patent [19]
Ebner et al.
[11] 3,776,531
[45] Dec. 4, 1973
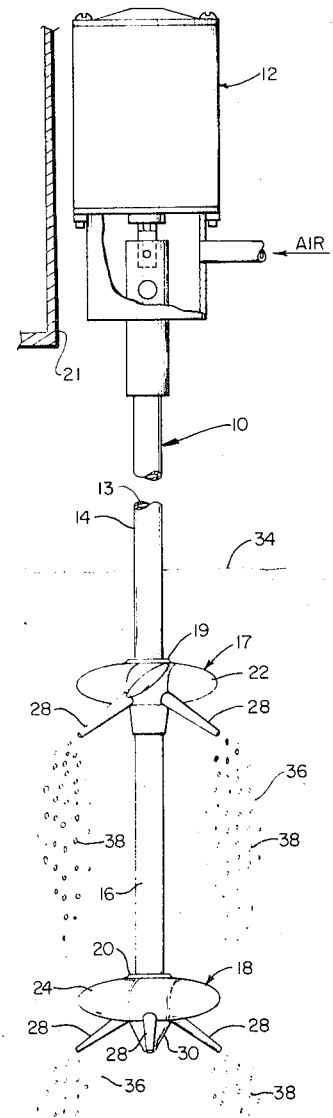

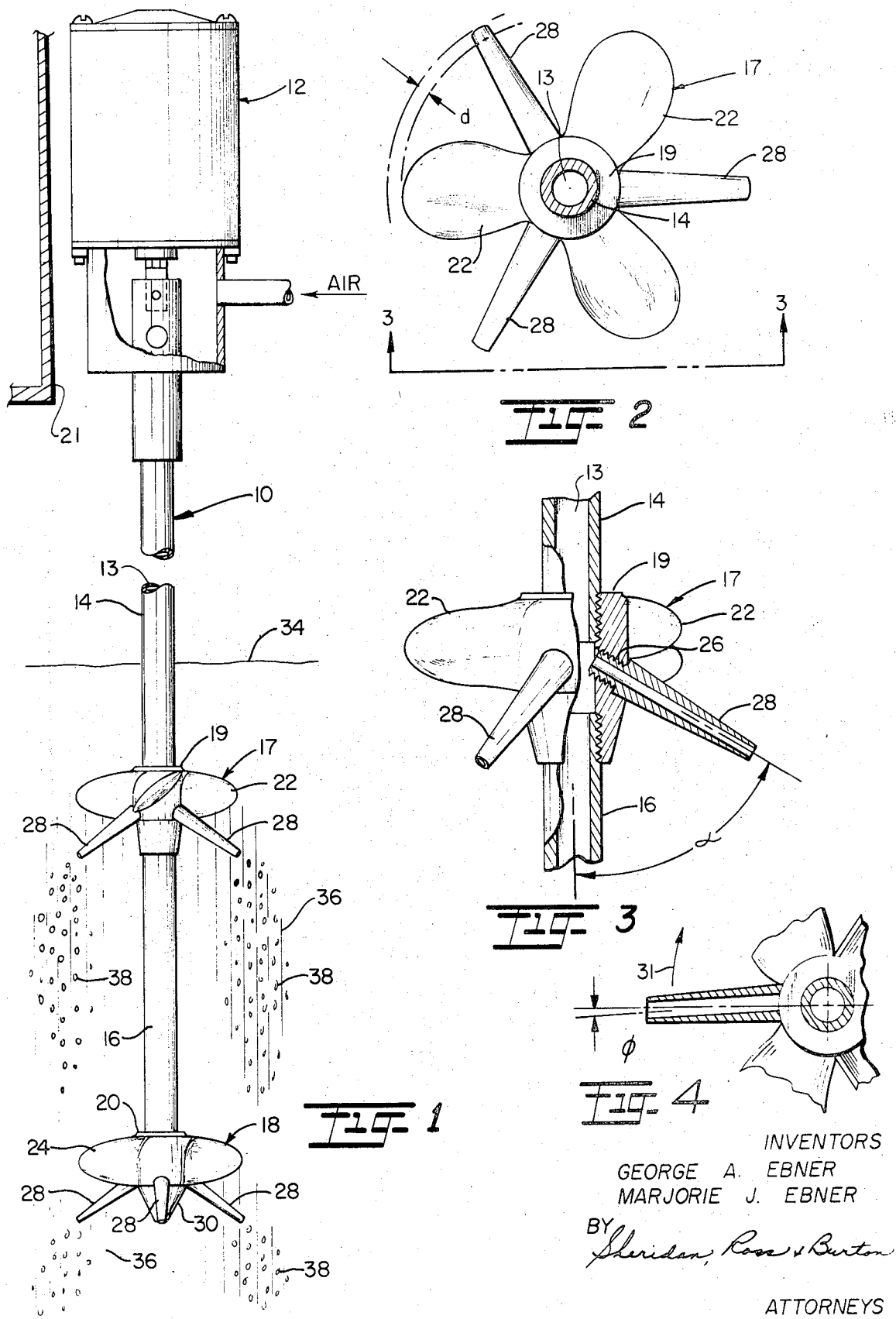

APPARATUS AND PROPELLER FOR ENTRAINING FLUIDS IN LIQUIDS

CROSS REFERENCE TO RELATED APPLICATION

This is a continuation-in-part patent application of U.S. Pat. application Ser. No. 1,523, filed on Jan. 8, 1970 now abandoned.

BACKGROUND OF THE INVENTION

The invention relates broadly to the dispersion of fluids, either liquids or gases, in liquids. The invention will be illustrated herein by its application to the aeration of sewage; however, it can be used for applications in general in which it is required to disperse a gas or liquid in another liquid.

In the art of sewage disposal treatment, whether by the activated sludge method or other methods, the role played by bacteria in the process of aerobic bacterial decomposition of sewage particles is well known. The growth and functioning of the bacteria is largely dependent upon a plentiful supply of air to provide the necessary oxygen; accordingly, at some stage of any sewage disposal treating process, air is mechanically introduced into the sewage which is contained in a tank in the presence of substantial amounts of water. The air is usually introduced while the water slurry of sewage is being agitated for the purpose of reducing the size of the sewage particles. This has led to the development of numerous methods and devices for the introduction of air into the slurry of sewage and water.

One prior art process for sewage treatment involved three treatment steps ordinarily performed in separate tanks constructed to provide for sewage transfer from one tank to the other in accordance with well known practices. The steps are referred to as "preconditioning," "aeration" and "clarification" steps. In accordance with this practice in the art, a motor is supported on the top of the compartment in which the sewage is being aerated. The motor is attached to a hollow shaft communicating with the atmosphere at its top and having propeller blades and aspirator tubes mounted on its lower section extending into the fluid in the tank. When the shaft is rotated, the screw propeller produces currents in the fluid and the rotating tubes in communication with the channel in the shaft force aspirate air into the liquid in the tank, in accordance with well known principles of physics, so that agitation and aeration are simultaneously accomplished. Sewage aeration devices of this type are disclosed in U.S. Pat. Nos. 2,928,661, 3,367,071, and 3,400,918.

While there are various parameters which control the efficiency for such devices, one of these is the capability of the screw propeller blades producing columnated streams or currents in the liquid sewage in an area where they will be subjected to the maximum amount of air introduced by the aspirator tubes. The practice has been to design the screw propeller blades with a pitch which will direct columnated currents vertically and substantially parallel to the propeller shaft, so that the currents will be in close proximity to the outlets of the aspirator tunes.

The amount of oxygen dissolved in the water increases as the size of the air bubbles decreases. Smaller minute bubbles of air have a reduced tendency to rise in the water because of surface tension effects and the viscosity of the water, and they tend to adhere to any object encountered, such as, sewage particles. By increasing the period of time that the bubbles are retained below the surface of the water, there is a corresponding increase in the amount of oxygen consumed from the air in the bubble. Accordingly, it is a principal object of this invention to provide an aerating device of the type described for sewage liquors which will result in a substantially increased amount of oxygen being dissolved in the water in the sewage liquids.

It is a further object of this invention to provide a method for introducing air into sewage liquors as they are being agitated in a manner which provides a substantially increased amount of much smaller sized air bubbles in the agitated sewage liquids.

SUMMARY OF THE INVENTION

This invention relates to an apparatus for dispersing or dispensing fluid, particularly a gas, in a liquid in combination with a container for holding said liquid, said apparatus comprising a propeller shaft mounted for rotation in said container, said shaft being closed at one end and having a channel therein communicating at the other end of said shaft with the fluid to be dispersed, means for rotating said shaft, at least one series of diametrically aligned screw propeller blades equidistantly spaced around said shaft extending radially from said shaft, said blades having an angle of pitch from their leading edges to their trailing edges which is acute to a plane disposed normally to the longitudinal axis of said shaft, and a plurality of diametrically aligned aspirator tubes disposed proximate to said blades equidistantly spaced around said shaft, each of said tubes having a free end disposed generally radially outwardly and at least as far as the outer portions of said blades, each of said tubes having a generally longitudinally extending opening formed therethrough, the longitudinally extending opening of each of said tubes being disposed in fluid communication with said channel whereby fluid may flow from said channel, through said openings and out of the free ends of said tubes, and each of the tubes being mounted on said shaft to form an included angle between the longitudinal axis of the opening adjacent the free end thereof and the longitudinal axis of the shaft of not less than 35° nor more than 75°. Each of the tubes is also mounted on said shaft to form an included angle between the longitudinal axis of the opening adjacent the free end thereof and a radially extending plane having the longitudinal axis of said shaft lying therein of not less than one-half degree nor more than 3°.

This invention also relates to a method of dispensing or dispersing a fluid in a liquid comprising the steps of generating a columnated current of liquid within a body of liquid, creating one or more zones of reduced pressure adjacent the outer periphery of said columnated current of liquid and rotating said zone or zones about the outer periphery of said columnated current of liquid, introducing a fluid into said rotating zone or zones at the interface thereof with the adjacent body of liquid and forming minute globules or bubbles of said fluid, and entraining said globules of fluid within said columnated current of liquid.

This invention also relates to a propeller for dispensing or dispersing fluid in a liquid, said propeller being substantially similar to that described above in connection with the apparatus of this invention.

BRIEF DESCRIPTION OF THE DRAWINGS

FIG. 1 is a side elevational view of the propeller shaft of the aeration apparatus of this invention with the motor for driving the shaft schematically shown;

FIG. 2 is a top plan view of the propeller shaft, propeller blades, and aspirator tubes;

FIG. 3 is an elevational view, in partial cross-section, taken along line 3—3 of FIG. 2; and FIG. 4 is a top plan view, in partial cross-section, showing the propeller and propeller shaft and a modified mounting of an aspirator tube on said shaft.

The term "fluid" as used herein to indicate the medium which is introduced into the liquid in the tank includes other gases than air and includes liquids. When the longitudinal axis of the shaft is referred to it means the long or vertical axis of the shaft.

Referring now to FIGS. 1 and 2, the shaft of the agitator propeller is indicated by the numeral 10 and a schematically represented conventional motor for driving the shaft is indicated by the numeral 12. The propeller shaft 10 is of tubular construction with a channel 13 in its interior which communicates with the atmosphere at its top as schematically shown. The tubular propeller shaft is constructed in two sections, as shown, the numeral 14 indicating the upper section and the numeral 16 designating the lower section. Mating screw threads are provided externally on the end of the upper section 14 and internally of the upper hub 19 for attachment of the upper section 14 to the lower section 16. Upper and lower propellers or "aero-props" 17 and 18, respectively, are mounted on the shaft 10 in a manner to be described. The propeller shaft 10 and motor 12 are located within a suitable housing or container 21.

The tubular lower section 16 of the propeller shaft 10 is securely attached to upper hub 19 and lower hub 20 and is closed at 30 as shown. Conventional screw-propeller blades 22 and 24 are mounted on the upper and lower hubs 19 and 20, respectively. Conducting ducts 26, angled downwardly as shown, are drilled through the walls of the propeller hubs to provide communication between the channel 13 of the shaft 10 and the liquid in which the propellers are submerged. Tubular aspirator tubes 28 are seated in their respective ducts 26 to provide communication between the channel 13 of the hollow shaft 10, the ducts 26 and the liquid in which the propellers are submerged. The aspirator tubes extend radially outwardly at least as far as the propeller blades and preferably a short distance $d$ beyond, i.e., approximately one-sixteenth to one-eighth inches for a 3 to 3½ inch diameter propeller. For a larger size of propeller diameter, the distance $d$ that the tubes extend radially outwardly will be somewhat greater than that specified above.

In the modification illustrated, the ducts 26 are drilled at an angle $\alpha$ to provide an angle of not less than 35° nor more than 75° between the longitudinal axis of the opening 27 formed through each aspirator tube 28 adjacent the free end thereof and the longitudinal axis of the shaft 10. The angle $\alpha$ must be maintained within this range if acceptable results are to be achieved. Good results have been obtained when the angle $\alpha$ is not less than 53° nor more than 65°. Excellent results have been obtained when the angle $\alpha$ is approximately 58°. The aspirator tubes 28 are mounted on the shaft 10 to form an included angle $\phi$ between the longitudinal axis of the opening 27 adjacent the free end of each tube and a radially extending plane having the longitudinal axis of said shaft lying therein of not less than one-half degree nor more than 3°. Although the aspirator tubes 28 are shown as comprising a truncation of a straight section of tubing, it will be understood that the free ends thereof may be slightly arcuately formed to extend opposite to the direction of rotation thereof, the direction of rotation being indicated by the arrow 29 in FIG. 4.

Various alternative constructions of the propeller shaft may be used. For example, the shaft may be made in one section instead of two sections, the hubs 19 and 20 may be dispensed with and the blades and aspirator tubes mounted directly on the shaft. Also, the bottom 30 of the lower section can be constructed with an opening and the opening filled with a plug.

In the modification shown, three diametrically aligned propeller blades are mounted on each hub with an aspirator tube mounted between each pair of blades at the base thereof. This is the preferred construction, although more or less blades can be used and, correspondingly, more or less aspirator tubes. The aspirator tubes are preferably mounted with their bases proximate to the lower sections of the propeller blades.

The pitch of the propeller blades from their leading to their trailing edges forms an included acute angle with a plane disposed normal to the longitudinal axis of the propeller shaft 10. The pitch should be such that currents are downwardly directed substantially parallel to the shaft 10 when the blades are rotated. The angle at which the aspirator tubes are mounted on the shaft will depend somewhat upon the angle of pitch of the propeller blades providing that the angular limitations set forth above are observed. The aspirator tubes are mounted so that air is discharged from them to strike the body of liquid adjacent the outer periphery of the columnated current of liquid created by the propeller blades.

In the illustrated modification shown, upper and lower propellers comprised of the hubs and propeller blades are used; however, a single propeller with its accompanying aspirator tubes can be used. In the modification, aspirator tubes are used with the lower propeller; however, these may be dispensed with depending upon the results desired. When two propellers are used, they are preferably of identical construction and the lower propeller is mounted at a distance from the upper propeller so that the lower propeller will pick up the columnated stream from the upper propeller before it has been widely dispersed in the liquid. The preferred distance is 6 inches and the agitator is operated with the upper propeller approximately 6 to preferably 12 inches below the surface of the liquid.

FIGS. 1 and 3 will now be referred to for an explanation of the operation of the invention. As shown in FIGS. 1 and 3, motor 12 having a screw-propeller shaft 10 with its upper end communicating with the atmosphere is mounted in the top of the schematically represented aerating container or tank 21 containing the liquid sewage indicated by the numeral 34, the propellers 17 and 18 and their corresponding aspirator tubes being submerged in the liquid sewage 34. Upon rotation of the propeller, the blades of the upper propellers 17 will create downwardly directed columnar currents 36 in the liquid 34. As the shaft rotates, the rotating aspirator tubes which are in communication with the atmosphere through the ducts 26 and the channel 13 of the shaft 10 will produce zones of reduced pressure or a vacuum which results in air being aspirated or sucked out of the free ends of the tubes outside of the outer periphery of the columnated current of liquid 36 in the form of minute globules or bubbles and then entrained within the columnated current of liquid. The use of a propeller constructed in accordance with this invention produces bubbles of exceptionally small size such that a substantial portion of the air entrained within the liquid in the form of said bubbles remains entrained therein for more than an hour after the motor has been turned off. The diameter of a substantial portion of the bubbles entrained within the liquid by the apparatus and propeller of this invention is believed to be approximately 175 microns or less. Thus, the diameter of the bubbles entrained within the liquid by the apparatus and propeller of this invention is substantially smaller than the ideal bubble size of 0.2 centimeter specified in U.S. Pat. No. 3,400,918. In any event, the bubble size is so small and the entrainment so efficient that a large quantity of bubbles is still entrained within the liquid for as long as one to two hours after rotation of the propeller and tubes has ceased.

Since the globules of fluid or bubbles of air have a relatively shorter distance to travel before becoming entrained in the columnated current of liquid, there is a reduced tendency for same to connect or join up with one another thereby to produce a larger size of globule or bubble than is the case where the free ends of the aspirating tubes extend normal to the shaft. As a consequence, the globules of fluid or bubbles of air remain in their small size both during and following entrainment within a columnated current of liquid. This results in a higher percentage of oxygen being dissolved in the liquid. Since rotation of the screw-type propeller blades cause a columnated current of liquid to be directed downwardly while at the same time entraining therein the globules or bubbles of air, it will be understood that the globules or bubbles will likewise be directed downwardly. Due to the small diameter thereof coupled with the phenomena of surface tension effect, said globules or bubbles remain entrained within the body of liquid for a considerably longer period of time than had heretofore been achieved with prior art devices and methods.

When the combined columnar liquid currents 36 and the entrained air bubbles 38 reach the lower propeller 18 and its accompanying downwardly angled aspirator tubes 28 the same effect is repeated, that is, the air bubbles from the rotating lower aspirator tubes 28 contact the outer periphery of the air impregnated columnar liquid currents 36. In the illustration presented, the pitch of the propeller blades and the angle of the aspirator tubes is such that the columnar currents of liquid and air are downwardly directed; however, the apparatus could be designed with the pitch of the blades and the angle of the aspirator tubes such that the columnated liquid columns and entrained air would be directed upwardly and the resulting device effectively operated but with a somewhat reduced efficiency concerning entrainment for the same predetermined period of time.

Tests were made with the agitator unit of the invention installed in an aeration tank of 600 gallons in a system having a capacity of 1,200 gallons. The type and size of the unit used is identified as follows:

| | |
|---|---|
| Motor | NEMA C-56 Frame, Totally enclosed non-ventilated, 1700 rpm, 1/6 horsepower, 115 volt 60 cycle |
| Propeller Shaft speed | 1700 rpm |
| Length of aspirator tubes | 1.8 inches |
| Angle α | 58° |
| Angle φ | 1.5° |
| Number of propeller Hubs | Two |
| Depth of emersion of upper hub | 12 inches |
| Depth of emersion of lower hub | 18 inches |
| Number of aspirating tubes per hub | 3 |
| Diameter of opening at free end of each aspirating tube | .140 inches |
| Pitch of propeller blades | 30° |
| Tank | Spheroidal shape, fiberglass construction |
| Quantity of air delivered into tank | 3.5 cfm |
| Diameter of propeller blades | 3 inches |

The tests were to determine factors accepted in the sewage treatment art as being determinative of the efficiency of sewage treatment systems. The factors are the biochemical oxygen demand (B.O.D.), the percent of settleable solids removed from the sewage, and the dissolved oxygen content in the effluent.

The B.O.D. was determined on the basic analytical procedures used by sanitary chemists and engineers in attempting to evaluate the effect of domestic sewage and industrial wastes on streams and lakes. The tests were conducted at the Colorado State University Sanitary Engineering Laboratories using a Hach manometric B.O.D. apparatus, and using the procedure as outlined in the Hach Company Bulletin No. 2M-3-8-67, 3rd Ed. The tests were conducted using the raw sewage as it enters the Fort Collins, Colo. municipal plant as the influent, the discharge to the system being controlled by means of a pump. The tests were run on steady state discharge of one-half gallon per minute (G.P.M.). Test data was obtained from an average of a series of samples run on influent and effluent samples. The effluent samples were taken 24 hours after the corresponding influent sample was taken, the modal retention time at one-half G.P.M. being approximately 24 hours arrived at by multiplying 0.58 (time factor) by 40, the latter figure being the hypothetical retention time in the unit at the rate of flow. The time factor is calculated on the theory presented in "Water Purification and Wastewater Treatment and Disposal," Fair, Geyer and Okum, pages 22-2 through 22-4 (Section 22-2).

The results of the tests indicated that the system removed 84 percent of the five-day B.O.D. at 20° Centigrade. The settleable solids for the same set of samples averaged 6.5 ml/l in the influent and 0.3 ml/l in the effluent, indicating that 95.4 percent of the settleable solids were removed. At a different test flow rate of 1 G.P.M. the dissolved oxygen content in the effluent was 4.3 mg/l. This represents about 54 percent saturation at the test elevation of 5,000 feet and the test temperature of 16° Centigrade.

For comparison purposes, it should be noted that the average five-day 20° Centigrade, B.O.D. of domestic wastewater is 143 mg/l, and that the average percent B.O.D. removal of secondary sewage treatment plants varies between 50 percent and 95 percent. Also, the average settleable solids of domestic waste water is 6 ml/l.

The results show that the agitator device of this invention when used in the aeration tank of a sewage treatment system is highly effective in reducing biochemical oxygen demand and settleable solids content, and in effecting the solution of a large amount of oxygen in the liquid sewage.

The favorable results obtained by this invention are believed to be due to the comparatively larger number of smaller sized globules or bubbles formed in the aggregate and the direction with which same enter the body of liquid relative to the direction of flow of the columnated current of liquid. The minute air bubbles formed by the apparatus and propeller of this invention contact the outer periphery of the columnated current of liquid at an acute angle thereby resulting in a substantially improved efficiency of entrainment without said bubbles increasing in size as a result of contacting each other prior to entrainment. Thus, entrainment of substantial quantities of air within the body of liquid exists for a considerable period of time following shutdown of the rotation of the propeller and the aspirator tubes.

It is to be understood that this invention is not limited to the exact embodiment of apparatuses, propellers and methods described and shown which are merely by way of illustration and not limitation, as various other forms and modifications will be apparent to those skilled in the art.

We claim:

1. In an apparatus for dispersing fluid in a liquid in combination with a container for holding said liquid:
   a. a propeller shaft mounted for rotation in said container, said shaft being closed at one end and having a channel therein communicating at the other end of said shaft with the fluid to be dispersed;
   b. means for rotating said shaft;
   c. at least one series of diametrically aligned screw-propeller blades equidistantly spaced around said shaft and extending radially therefrom, said blades having an angle of pitch from their leading edges to their trailing edges which is acute to a plane disposed normal to the longitudinal axis of said shaft; and
   d. a plurality of diametrically aligned aspirator tubes disposed proximate to said blades equidistantly spaced around said shaft,
      i. each of said tubes having a free end disposed generally radially outwardly at least as far as the outer portions of said blades,
      ii. each of said tubes having a generally longitudinally extending opening formed therethrough, the longitudinally extending opening of each of said tubes being disposed in fluid communication with said channel whereby fluid may flow from said channel, through said openings and out of the free ends of said tubes,
      iii. each of said tubes being mounted on said shaft to form an included angle between the longitudinal axis of the opening adjacent the free end thereof and the longitudinal axis of the shaft of not less than 35° nor more than 75°, and
      iv. each of said tubes also being mounted on said shaft to form an included angle between the longitudinal axis of the opening adjacent the free end thereof and a radially extending plane having the longitudinal axis of said shaft lying therein of not less than one-half degree nor more than three degrees.

2. In an apparatus for dispersing fluid as described in claim 1 above in which each of said tubes are mounted on said shaft to form an included angle between the longitudinal axis of the opening adjacent the free end thereof and the longitudinal axis of the shaft of not less than 53° nor more than 65°.

3. In an apparatus for dispersing fluid as described in claim 2 above in which each of said tubes are mounted on said shaft to form an included angle between the longitudinal axis of the opening adjacent the free end thereof and the longitudinal axis of the shaft of approximately 58°.

4. In an apparatus for dispersing fluid in a liquid in combination with a container for holding said liquid:
   a. a propeller shaft mounted for rotation in said container, said shaft being closed at one end and having a channel therein communicating at the other end of said shaft with the fluid to be dispersed;
   b. means for rotating said shaft;
   c. at least one series of diametrically aligned screw-propeller blades equidistantly spaced around said shaft extending radially from said shaft, said blades having an angle of pitch from their leading edges to their trailing edges which is acute to a plane disposed normal to the longitudinal axis of said shaft; and
   d. a plurality of diametrically aligned aspirator tubes disposed proximate to said blades equidistantly spaced around said shaft,
      i. each of said tubes having a free end disposed generally radially outwardly at least as far as the outer portions of said blades,
      ii. each of said tubes having a generally longitudinally extending opening formed therethrough, the longitudinally extending opening of each of said tubes being disposed in fluid communication with said channel whereby fluid may flow from said channel, through said openings and out of the free ends of said tubes, and
      iii. each of said tubes being mounted on said shaft to form an included angle between the longitudinal axis of the opening adjacent the free end thereof and the longitudinal axis of the shaft of not less than 35° nor more than 75°.

5. A propeller for dispersing fluid in a liquid comprising:
   a. a propeller shaft mounted for rotation, said shaft being closed at one end and having a channel therein for communicating at the other end of said shaft with the fluid to be dispersed;
   b. a first tubular propeller hub mounted on said shaft;
   c. three diametrically aligned equidistantly spaced screw-propeller blades mounted on said first hub and extending radially therefrom, said blades having an angle of pitch from their leading edges to their trailing edges which is acute to the longitudinal axis of said shaft;
   d. a duct formed between said of said blades and extending into said channel;
   e. a hollow aspirator tube mounted in each of said ducts,
      i. each of said tubes having a free end disposed generally radially outwardly at least as far as the outer portions of said blades,
      ii. each of said tubes having a generally longitudinally extending opening formed therethrough, the longitudinally extending opening of said tubes being disposed in fluid communication with said channel whereby fluid may flow from said channel, through said openings and out of the free ends of said tubes, iii. each of said tubes being mounted on said shaft to form an included angle between the longitudinal axis adjacent the free end thereof and the longitudinal axis of the shaft of not less than 35° nor more than 75°, and iv. each of said tubes also being mounted on said shaft to form an included angle between the longitudinal axis of the opening adjacent the free end thereof and a radially extending plane having the longitudinal axis of said shaft lying therein of not less than one-half degree nor more than 3°.

6. A propeller as described in claim 5 above in which each of said tubes is mounted on said shaft to form an included angle between the longitudinal axis of the opening adjacent the free end thereof and the longitudinal axis of the shaft of not less than 53° nor more than 65°.

7. A propeller as described in claim 5 above in which each of said tubes is mounted on said shaft to form an included angle between the longitudinal axis of the opening adjacent the free end thereof and the longitudinal axis of the shaft of approximately 58°.

8. A propeller as described in Claim 5 above including a second tubular propeller hub mounted on said shaft and constructed as said first tubular propeller hub and having like mounted screw-propeller blades and aspirator tubes, said second tubular hub being spaced from said first tubular propeller hub such that it will pick up a columnated current of liquid produced by the blades on said first propelle tubular hub.

9. A propeller for dispersing fluid in a liquid, said propeller comprising:

a. a propeller shaft mounted for rotation, said shaft being closed at one end and having a channel therein for communicating at the other end of said shaft with the fluid to be dispersed;

b. a plurality of diametrically aligned equidistantly spaced screw-propeller blades spaced around said shaft and extending radially therefrom, said blades having an angle of pitch from their leading edges to their trailing edges which is acute to a plane disposed normal to the longitudinal axis of said shaft; and c. a plurality of diametrically aligned aspirator tubes disposed proximate to said blades equidistantly spaced around said shaft, i. each of said tubes having a free end disposed generally radially outwardly at least as far as the outer portions of said blades, ii. each of said tubes having a generally longitudinally extending opening formed therethrough, the longitudinally extending opening of each of said tubes being disposed in fluid communication with said channel whereby fluid may flow from said channel through said openings and out of the free ends of said tubes, and iii. each of said tubes being mounted on said shaft to form an included angle between the longitudinal axis of the opening adjacent the free end thereof and the longitudinal axis of the shaft of not less than 35° nor more than 75°.

* * * * *

UNITED STATES PATENT OFFICE
CERTIFICATE OF CORRECTION

Patent No. 3,776,531    Dated December 4, 1973

Inventor(s) George A. Ebner and Marjorie J. Ebner

It is certified that error appears in the above-identified patent and that said Letters Patent are hereby corrected as shown below:

Column 1, Line 62, omit "tunes" and insert therefor --tubes--

Column 2, Line 28, omit "normally" and insert therefor --normal--

Column 8, Line 56, omit the first occurrence of "said" and insert therefor -- each --.

Signed and sealed this 17th day of September 1974.

(SEAL)
Attest:

McCOY M. GIBSON, JR.
Attesting Officer

C. MARSHALL DANN
Commissioner of Patents